US012771596B2

(12) United States Patent
D'Souza et al.

(10) Patent No.: US 12,771,596 B2
(45) Date of Patent: Oct. 20, 2026

(54) SYSTEM, METHOD, AND COMPUTER PROGRAM FOR LEVERAGING NETWORK STATE INFORMATION WHEN EXPOSING CORE NETWORK CAPABILITIES

(71) Applicant: Amdocs Development Limited, Limassol (CY)

(72) Inventors: Andrew D'Souza, Silver Spring, MD (US); Joe Hogan, Malahide (IE); Cameron Ross Dunne, Newbridge (IE)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 93 days.

(21) Appl. No.: 18/669,331

(22) Filed: May 20, 2024

(65) Prior Publication Data

US 2025/0358179 A1 Nov. 20, 2025

(51) Int. Cl.
*G06F 15/177* (2006.01)
*H04L 41/0806* (2022.01)
*H04L 47/70* (2022.01)

(52) U.S. Cl.
CPC .......... *H04L 41/0806* (2013.01); *H04L 47/82* (2013.01)

(58) Field of Classification Search
CPC ............................ H04L 41/0806; H04L 47/82
USPC .......................................................... 709/220
See application file for complete search history.

(56) References Cited

U.S. PATENT DOCUMENTS 7,873,976 B2 * 1/2011 Vitenberg ........... H04L 27/0002 379/93.07
8,422,357 B1 * 4/2013 Podolsky ............ H04L 41/0661 370/254
8,972,803 B2 * 3/2015 McKiou .............. G06F 11/0757 714/55
9,020,497 B2 * 4/2015 Bot ........................ H04W 40/20 455/412.2
9,030,926 B2 * 5/2015 Han ...................... H04L 12/185 370/219
9,036,462 B2 * 5/2015 Han ........................ H04L 47/15 370/216
9,130,857 B2 * 9/2015 Han ........................ H04L 47/15
9,621,853 B1 * 4/2017 Yang ......................... G06F 8/38
9,705,949 B2 * 7/2017 Cui ....................... H04L 41/122
9,736,029 B2 * 8/2017 He ........................ H04L 47/781
9,838,284 B2 * 12/2017 Shaw ...................... H04L 43/08
9,935,862 B2 * 4/2018 Kanevsky ............. H04L 61/103
9,998,709 B2 * 6/2018 Yang ......................... G06F 8/38
10,110,444 B2 * 10/2018 Bugenhagen ....... H04L 41/0853
10,111,127 B2 * 10/2018 Cui ..................... H04W 28/021
(Continued)

FOREIGN PATENT DOCUMENTS

EP 3851973 A1 * 7/2021 ......... H04L 41/0806

OTHER PUBLICATIONS

International Search Report and Written Opinion from PCT Application No. PCT/IB2025/055193, dated Aug. 14, 2025, 12 pages.

*Primary Examiner* — Alicia Baturay
(74) *Attorney, Agent, or Firm* — Zilka-Kotab, P.C.

(57) ABSTRACT

As described herein, a system, method, and computer program are provided for leveraging network state information when exposing network capabilities. A request for one or more capabilities of a network is received from an application by a platform that interfaces the network. The platform communicates with an active inventory of the network for handling the request.

16 Claims, 7 Drawing Sheets

(56) References Cited

U.S. PATENT DOCUMENTS 10,135,712 B2 * 11/2018 Wu ............ G06F 8/38
10,148,561 B2 * 12/2018 Cui ............ H04W 28/24
10,187,437 B2 * 1/2019 Cui ............ H04L 41/122
10,284,635 B2 * 5/2019 Yang ............ G06F 8/38
10,320,748 B2 * 6/2019 Stair ............ H04L 63/0236
10,375,744 B2 * 8/2019 Cui ............ H04W 36/0033
10,454,784 B2 * 10/2019 Bugenhagen ....... H04L 41/0853
10,491,705 B2 * 11/2019 Oetting ............ G06F 3/04815
10,515,119 B2 * 12/2019 Kirk ............ G06F 16/24578
10,554,529 B2 * 2/2020 Kanevsky ............ H04L 61/58
10,567,260 B2 * 2/2020 Wu ............ G06F 8/38
10,574,568 B2 * 2/2020 Cui ............ H04W 28/24
10,608,907 B2 * 3/2020 Chen ............ G06N 20/00
10,609,590 B2 * 3/2020 Cui ............ H04L 61/2514
10,771,146 B1 * 9/2020 Singh ............ H04B 7/1858
10,797,960 B2 * 10/2020 Zavesky ............ H04L 41/0661
10,827,006 B2 * 11/2020 Hiltunen ............ G06Q 10/0834
10,841,175 B2 * 11/2020 Bugenhagen ....... H04L 41/0853
10,841,509 B2 * 11/2020 Tofighbakhsh ........ G06N 20/00
10,965,621 B2 * 3/2021 Cui ............ H04L 49/70
10,999,179 B2 * 5/2021 Kanevsky ............ H04L 61/58
10,999,345 B2 * 5/2021 Cui ............ H04N 21/43637
11,017,017 B2 * 5/2021 Trim ............ G06Q 10/10
11,039,321 B2 6/2021 Senarath et al.
11,089,641 B2 * 8/2021 Cui ............ H04W 36/0033
11,146,965 B2 10/2021 Deviprasad et al.
11,349,810 B2 * 5/2022 Stair ............ H04L 63/108
11,374,824 B2 * 6/2022 Wickes ............ H04L 41/147
11,425,225 B2 * 8/2022 Huang ............ H04L 67/289
11,476,932 B2 * 10/2022 Rahman ............ H04B 10/70
11,477,688 B2 * 10/2022 Trim ............ H04W 24/02
11,507,262 B2 * 11/2022 Campbell ............ G06F 3/0482
11,540,139 B2 * 12/2022 Bishay ............ H04W 16/02
11,601,344 B1 * 3/2023 Kanevsky ............ H04L 43/0817
11,604,515 B2 * 3/2023 Wickes ............ G06F 3/011
11,632,713 B2 * 4/2023 Wang ............ H04L 41/16
370/329
11,663,298 B2 * 5/2023 Fan ............ G06F 21/602
705/59
11,671,489 B2 * 6/2023 Thyagarajan ....... G06F 9/45558
709/201
11,914,855 B2 * 2/2024 Campbell ............ G06F 3/0482
11,962,460 B1 * 4/2024 Draznin ............ H04L 67/50
12,185,425 B2 * 12/2024 Xiong ............ H04L 65/80
12,207,218 B2 * 1/2025 Li ............ H04L 67/34
12,360,873 B2 * 7/2025 Martella ............ G06F 11/0775
2010/0293269 A1 * 11/2010 Wilson ............ G06F 9/5061
709/224
2015/0263902 A1 * 9/2015 He ............ H04L 47/781
709/226
2021/0168719 A1 * 6/2021 Sugiyama ......... H04W 52/0235
2021/0250220 A1 * 8/2021 Yang ............ H04L 41/052
2024/0080277 A1 3/2024 Lee et al.
2024/0137248 A1 4/2024 Ritchie et al.
2024/0281280 A1 * 8/2024 Bainbridge ........... G06F 9/4881
2024/0422808 A1 * 12/2024 Alasti ............ H04W 28/16

* cited by examiner

SYSTEM, METHOD, AND COMPUTER PROGRAM FOR LEVERAGING NETWORK STATE INFORMATION WHEN EXPOSING CORE NETWORK CAPABILITIES

FIELD OF THE INVENTION

The present invention relates to exposing network capabilities for use by external entities.

BACKGROUND

As communications service providers (CSPs) accelerate their 5G (or other network) Stand-Alone (SA) deployments, there is a growing industry consensus that, to generate new revenues, they will have to expose various network capabilities to external entities such as partners and enterprises.

3rd Generation Partnership Project (3GPP) has defined the Network Exposure Function (NEF) and a suite of application programming interfaces (APIs) to enable exposure of core network capabilities. However, as part of their specified operations these APIs do not consider the current state of the network or the availability of resources, which could result in sub-optimal service experiences for CSP customers and possible failure to meet service level agreements.

CSPs also deploy End-to-end Service Orchestration (E2ESO) platforms for service design, deployment, operations, and management. A key component of E2ESO is Inventory Management, which maintains an up-to-date view of all key network resources. However, this information is not currently used in combination with NEF-based exposure capabilities, and therefore is not currently leveraged to enable more intelligent request handling and decision making. In particular, the standards-based procedures for network API exposure (via NEF) do not specify or require any interaction between the NEF and external entities, to validate whether received network API requests can be successfully fulfilled in the network.

There is thus a need for addressing these and/or other issues associated with the prior art. For example, there is a need to leverage network state information when exposing network capabilities.

SUMMARY

As described herein, a system, method, and computer program are provided for leveraging network state information when exposing network capabilities. A request for one or more capabilities of a network is received from an application by a platform that interfaces the network. The platform communicates with an active inventory of the network for handling the request.

DETAILED DESCRIPTION

Figure 1:
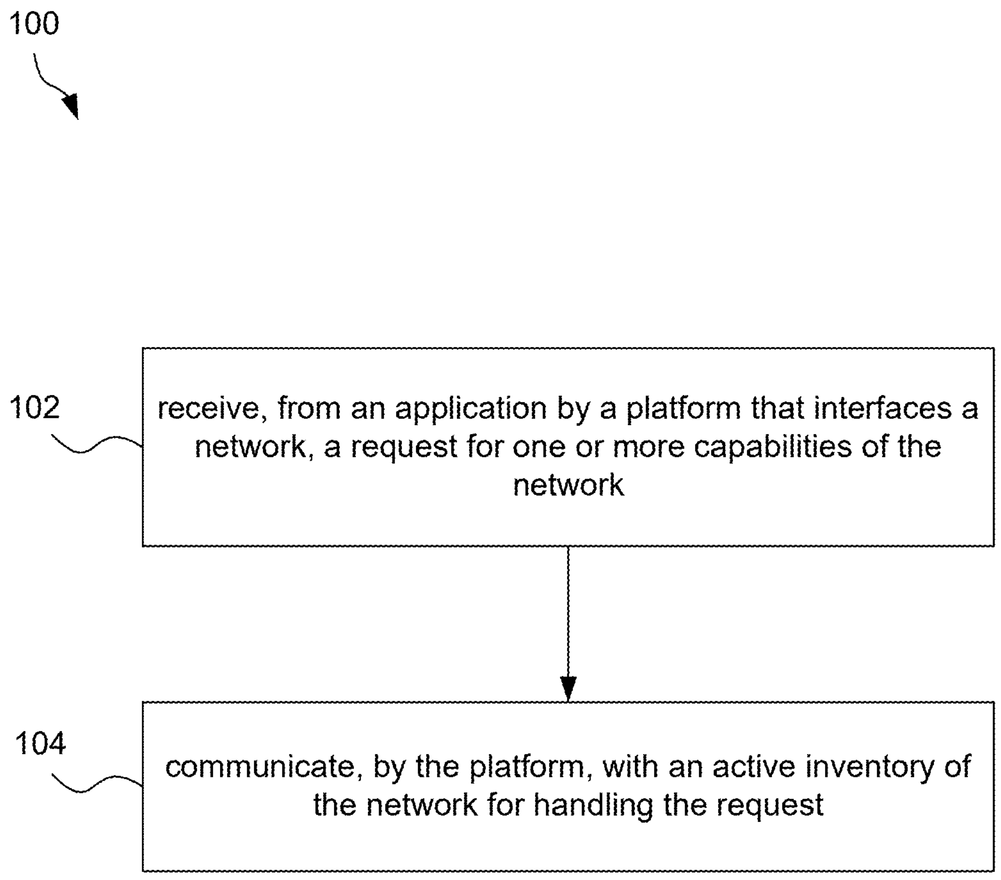
FIG. 1 illustrates a method for leveraging network state information when exposing network capabilities, in accordance with one embodiment.

FIG. 1 illustrates a method 100 for leveraging network state information when exposing network capabilities, in accordance with one embodiment. The method may be carried out by a computer system, such as that described below with respect to FIGS. 6 and/or 7.

In particular, the method 100 is carried out by a platform that interfaces a network and one or more applications external to the network. The network may be a 4G network, a 5G network, etc. In an embodiment, the network is provided by a communication service provider and the application may be provided by an entity external to the communication service provider.

The network includes various capabilities, such as network services, network functions, network resources, a business support system (BSS), etc. that are exposed to the external application(s) via the platform, such that the external application(s) are able to access the capabilities of the network for their own purposes.

In operation 102, a request for one or more of the capabilities of the network is received from an (external) application by the platform that interfaces the network. The request refers to any request involving one or more of the capabilities of the network. In an embodiment, the request may be associated with an order for a service in the network.

In an embodiment, the request includes at least one event notification that is of interest to the application. In another embodiment, the request informs of at least one parameter (e.g. bandwidth in the network) to be provisioned. In another embodiment, the request is for setup of an edge computing deployment in the network. In another embodiment, the request is for a failed network resource allocation. For example, the request may be associated with a failed background data transfer negotiation, and may include for example to create additional resources in the network. As another example, the request may be associated with a failed provisioning of a quality of service, and may include for example to allocate additional resources to meet a desired quality of service. In another embodiment, the request informs of at least one provisioned traffic influence rule including for an immediate or planned setup of an edge computing deployment in the network.

In operation 104, the platform communicates with an active inventory of the network for handling the request. The active inventory of the network refers to an inventory of capabilities of the network. In an embodiment, the active network inventory may include a real-time or near-real time state of the capabilities of the network. In an embodiment, the active network inventory may be managed by an End-to-End Service Orchestrator, which may be operating in the network.

As mentioned, the platform communicates with an active inventory of the network specifically for handling the request. In an embodiment, the active inventory may be used to handle the request by storing information associated with the request. In another embodiment, the active inventory may be used to validate resource availability before parameters are stored. In another embodiment, the active inventory may be used to verify availability of required network resources for the request. In another embodiment, the active inventory may be used to reserve required network resources for future use by the application.

Just by way of example, the request may be associated with a failed background data transfer negotiation and may include a further request to create additional resources in the network, which may be accomplished through the active inventory. As another example, the request may be associated with a failed quality of service request and may include to a further request allocate additional resources to meet a desired quality of service.

To this end, the method 100 may leverage network state information included in the active inventory when external applications issue requests associated with network capabilities that are exposed to the application. This can enable these requests to be used to inform an inventory management component (having the active inventory) of the external application's current or future network resource needs, to verify the availability of required network resources when processing the received requests, and to reserve the required network resources for future use by the application.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
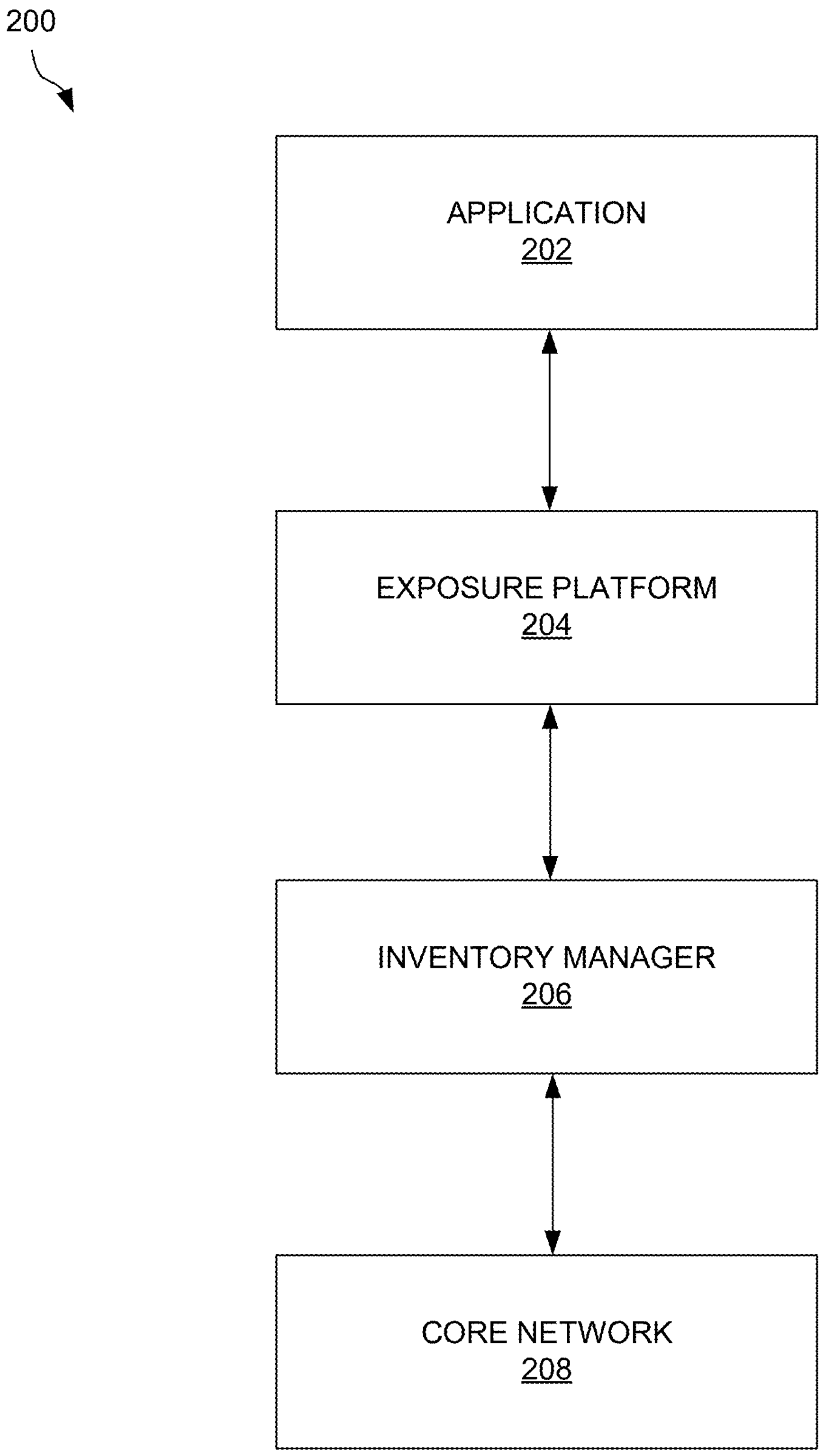
FIG. 2 illustrates a flow diagram of a system for leveraging network state information when exposing network capabilities, in accordance with one embodiment.

FIG. 2 illustrates a flow diagram of a system 200 for leveraging network state information when exposing network capabilities, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, an application 202 interfaces with an exposure platform 204. The application may be provided by an entity external to a provider of the network, referred to as a communication service provider. Capabilities of the network are exposed by the communication service provider so that the application can use those capabilities.

The exposure platform 204 enables the communication service provider to offer programmatic access to the capabilities of its network, including the services, systems and resources of the network, via a robust application programming interface (API) framework that supports the key common features and functions necessary for secure exposure of the communication service provider APIs to external parties. The exposure platform 204 shields the external party applications from the complexity of communication service provider systems and networks by exposing simple, easy-to-use, intent-based APIs and providing a flexible workflow capability to interpret the received API requests. Two key communication service provider systems to which the exposure platform 204 enables API-based access are an inventory manager 206 and a network exposure function (NEF—not shown in the present figure).

The inventory manager 206 maintains an active inventory for the network. In an embodiment, the inventory manager 206 is a component of an End-to-End Service Orchestrator (E2ESO) which provides the communication service provider with the ability to manage the design, orchestration, inventory, closed-loop operations and assurance for 4G, 5G, hybrid and cloud networks, for example. The E2ESO offers an advanced and innovative service and network automation platform, with modular, flexible, and open service and network lifecycle management functions to quickly and easily drive the service provider's automation journeys. A key component of the E2ESO is the active inventory maintained by the inventory manager 206, which supports any network, cloud, and service, supplying the real-time data required to automate operations across current and future networks. It simplifies interactions with service fulfillment, network planning, and orchestration using intent-driven design processes, ensuring the efficient allocation of the resources required to deliver and maintain customer service level agreements (SLAs).

The NEF is a 3GPP-specified function that supports the external exposure of capabilities of 4G and 5G mobile core network functions. The scope of external exposure capabilities may include, for example:

Monitoring of specific events for devices connected to the mobile network (4G or 5G) and making the monitoring events available for exposure to external parties.

Provisioning provision of service or device-related information which can be used by the mobile core network.

Policy and Charging capabilities include handling access and mobility management, quality of service, and charging policies for connected devices based on requests from external parties.

Analytics reporting allows external parties to fetch or subscribe to analytics information generated by the network System.

Figure 3:
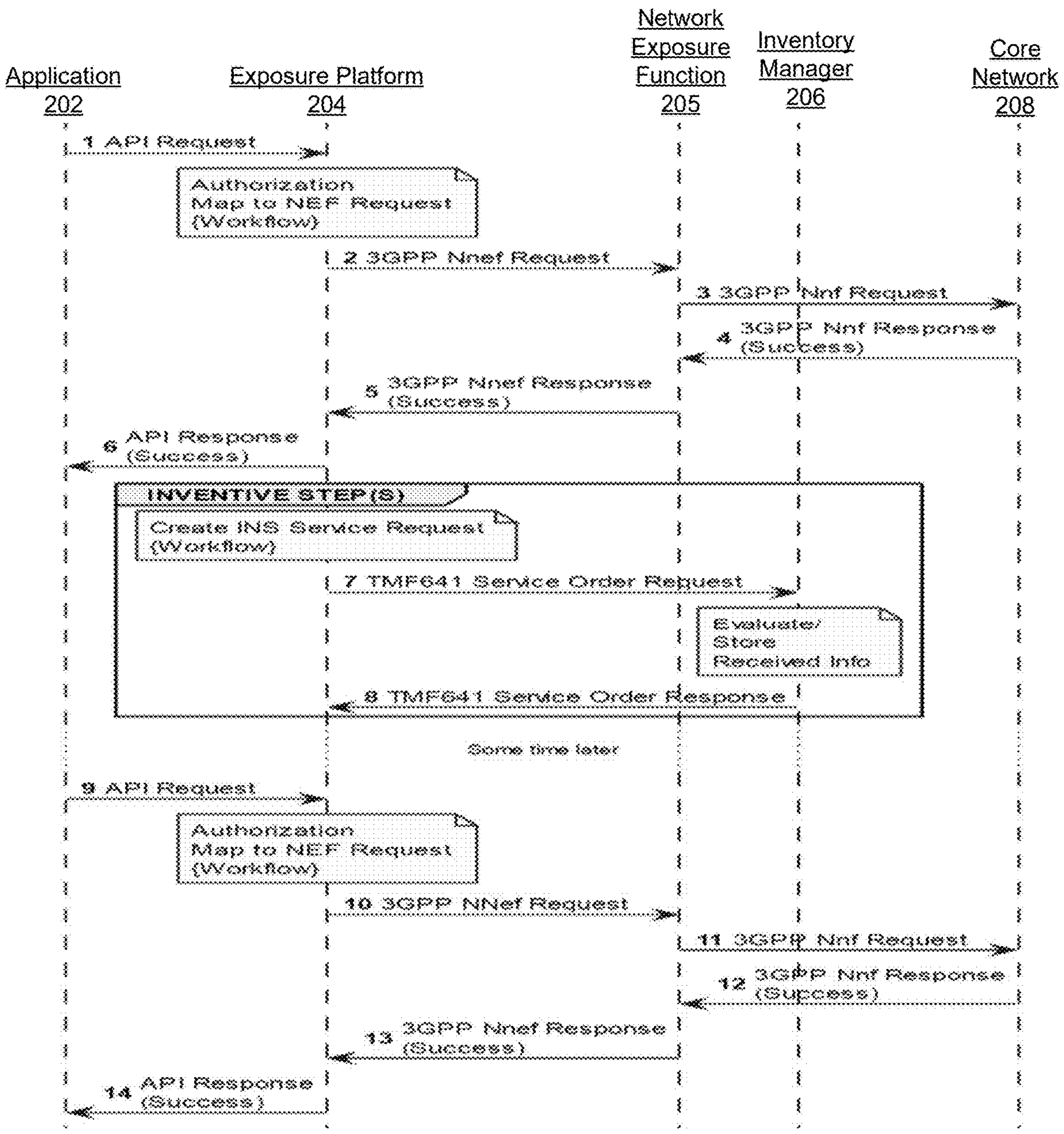
FIG. 3 illustrates a communication flow diagram for informing an inventory management component of an external application's current or future network resource needs, in accordance with one embodiment.
Figure 4:
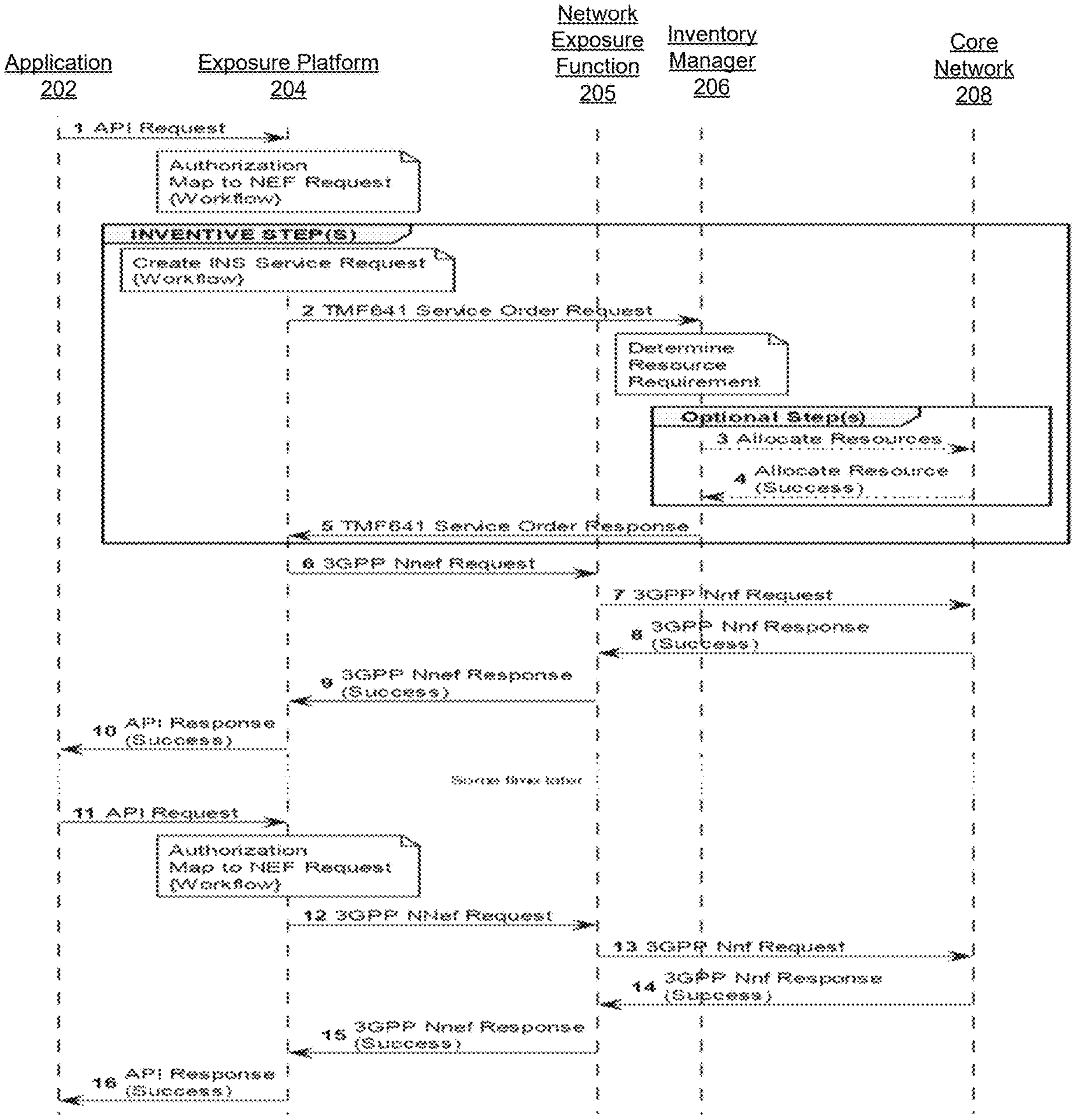
FIG. 4 illustrates a communication flow diagram for verifying the availability of required network resources when processing a received request from an external application and reserving the resources for future use when available, in accordance with one embodiment.
Figure 5:
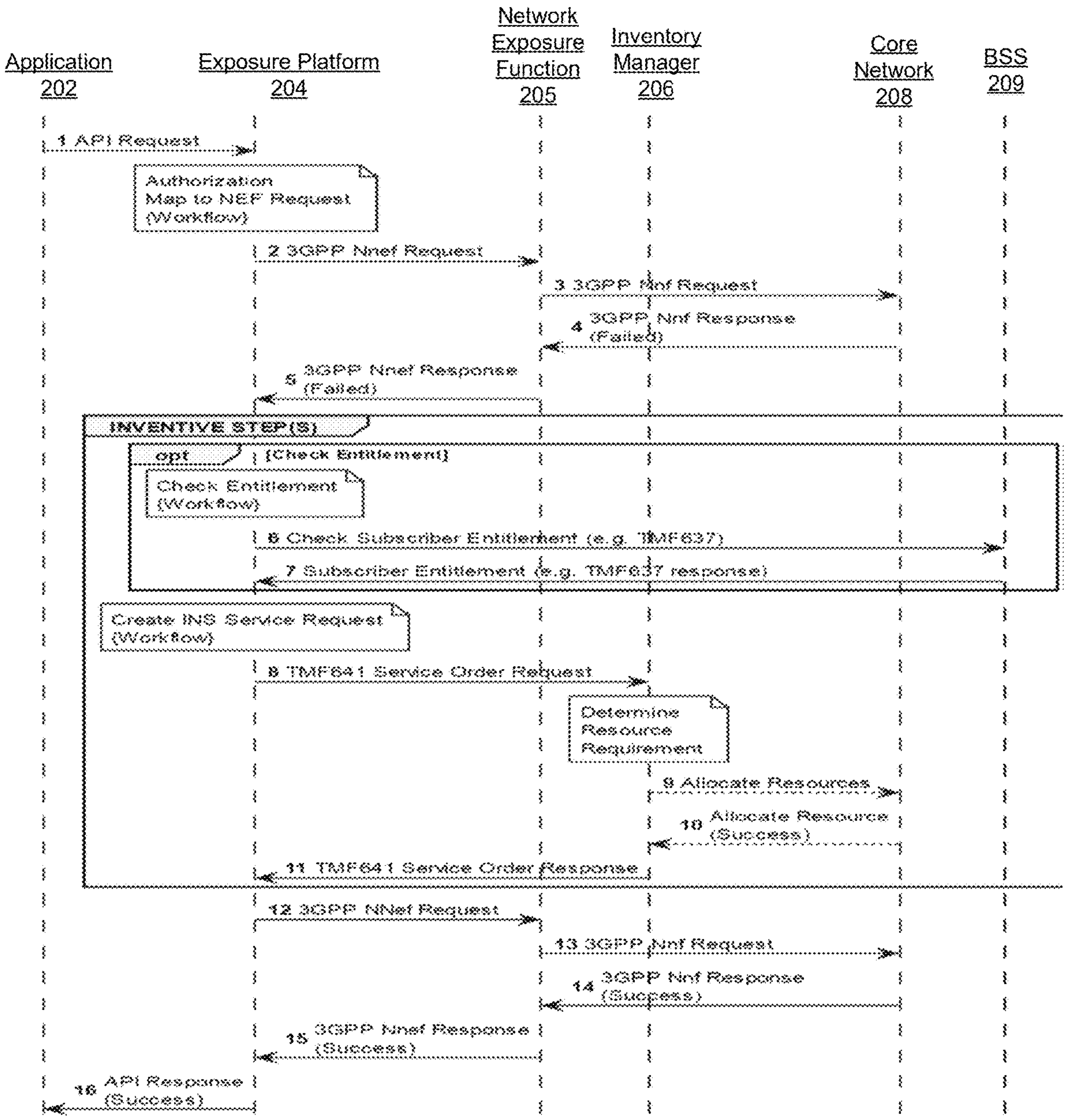
FIG. 5 illustrates a communication flow diagram for allocating required network resources for future use by an external application, in accordance with one embodiment.

A request for one or more capabilities of the core network 208 is received from the application 202 by the exposure platform 206. The exposure platform 204 communicates with the active inventory of the inventory manager 206 for handling the request. FIGS. 3-5 below illustrate various communication flows that may be implemented using this system 200.

FIG. 3 illustrates a communication flow diagram for informing an inventory management component of an external application's current or future network resource needs, in accordance with one embodiment. The communication flow diagram is disclosed as being carried out, at least in part, via the components of the system 200 of FIG. 2.

The present communication flow may be carried out for the following scenarios:

1. Monitoring Event: exposure platform 204 informs inventory manager 206 of event notifications that may be of interest to the application 202.
2. Parameter Provision: exposure platform 204 informs inventory manager 206 of provisioned parameters. Optionally, a unified data management (UDM)/unified data repository (UDR) can validate resource availability before the application-provided parameters are stored.

As shown, the application 202 issues an API request to the exposure platform 204 (denoted as step 1). The exposure platform 204 in turn maps the request to an NEF-specific request and issues the NEF-specific request to the NEF 205 (denoted as step 2). The NEF 205 issues the request to the core network 208 (denoted as step 3) which returns a response ("success" in the present example) to the NEF 205

(denoted as step 4). The response is returned to the exposure platform 204 (denoted as step 5) and in turn to the application 202 (denoted as step 6).

The exposure platform 204 then creates a service order request for the inventory manager 206 denoted as step 7), which evaluates and stores the received information and then issues a service order response to the exposure platform 204 denoted as step 8). In a later API request issued by the application 202 to the exposure platform 204 (denoted as step 9), the process as described above is repeated. For the later API request (step 9), previously stored information from when the NEF 205 issued the request to the core network 208 (step 3) may be used such that the service order request/response (steps 7-8) are not repeated.

FIG. 4 illustrates a communication flow diagram for verifying the availability of required network resources when processing a received request from an external application and reserving the resources for future use when available, in accordance with one embodiment. The communication flow diagram is disclosed as being carried out, at least in part, via the components of the system 200 of FIG. 2.

The present communication flow may be carried out for the following scenarios:

1. Traffic Influence: exposure platform 204 validates with inventory manager 206 resource availability for provisioned Traffic Influence rule(s), such as for Edge Setup which may for the future/planned.
2. Background Data Transfer (BDT): exposure platform 204 validates with inventory manager 206 resource availability for the BDT schedule offered by policy control function (PCF) of the network. Alternatively, PCF could do this directly via network data analytics function (NWDAF) or inventory manager 206. Similar use for Planned Data Transfer with quality of service (PDTQ) or Application Data Transfer (ADT).

As shown, the application 202 issues an API request to the exposure platform 204. The exposure platform 204 in turn maps the request to an inventory manager 206-specific request which is issued as a service request directly to the inventory manager 206. The inventory manager 206 determines resource requirements for the request and requests their allocation by the core network 208. The core network 208 issues a response to the request ("success" in the present example) to the inventory manager 206, which in turn issues a service order response to the exposure platform 204.

The exposure platform 204 then issues an NEF-specific request to the NEF 205. In an embodiment, issuing the NEF-specific request to the NEF 205 may be conditioned on a "success" response being issued as the service order response from the inventory manager 206. In this case, if the prior step fails, then the request to the NEF 205 must not be issued. The NEF 205 issues the request to the core network 208 which returns a response ("success" in the present example) to the NEF 205. The response is returned to the exposure platform 204 an in turn to the application 202.

In a later API request issued by the application 202 to the exposure platform 204, the process may be partially repeated as described above in FIG. 3.

FIG. 5 illustrates a communication flow diagram for allocating required network resources for future use by an external application, in accordance with one embodiment. The communication flow diagram is disclosed as being carried out, at least in part, via the components of the system 200 of FIG. 2.

The present communication flow may be carried out for the following scenarios:

1. Traffic Influence: exposure platform 204 informs inventory manager 206 of provisioned TI rule(s), for example for an immediate or future/planned edge setup.
2. BDT (or PDTQ): exposure platform 204 interacts with inventory manager 206 regarding a failed BDT (or PDTQ) negotiation, to create additional resources.
3. QoS: exposure platform 204 interacts with inventory manager 206 regarding a failed quality of service request, to allocate additional resources to meet desired QoS.

As shown, the application 202 issues an API request to the exposure platform 204. The exposure platform 204 in turn maps the request to an NEF-specific request and issues the NEF-specific request to the NEF 205. The NEF 205 issues the request to the core network 208 which returns a response ("failed" in the present example) to the NEF 205. The response is returned to the exposure platform 204.

The exposure platform 204 may then check subscriber entitlement with the business support system (BSS) 209. The subscriber entitlement refers to an entitlement of the subscribed (owning the application 202) for the requested network capability. The BSS 209 issues a response to the exposure platform 204.

The exposure platform 204 then issues a service order request directly to the inventory manager 206. The inventory manager 206 determines resource requirements for the request and requests their allocation by the core network 208. The core network 208 issues a response to the request ("success" in the present example) to the inventory manager 206, which in turn issues a service order response to the exposure platform 204.

The exposure platform 204 issues an NEF-specific request to the NEF 205. The NEF 205 issues the request to the core network 208 which returns a response ("success" in the present example) to the NEF 205. The response is returned to the exposure platform 204 an in turn to the application 202.

SUMMARY

To this end, FIGS. 3-5 illustrate various interactions between the NEF 205 and inventory manager 206 as part of the processing of API requests in the NEF 205, enabling these requests:

- to inform the inventory manager 206 of the external application's 202 current or future network resource needs;
- to verify the availability of required network resources when processing the received requests;
- to schedule/reserve the required network resources for future use; and so on.

The specific interactions between NEF 205 and inventory manager 206 focus on the "active inventory" capability of the inventory manager 206 and uses this real-time (or near real-time) view of the state of network resources to deliver more intelligent, enhanced, and holistic handling of API requests received from the application 202 running outside the network domain.

For example, the interactions among the NEF 205, E2ESO inventory manager 206 and various network functions operating in different network domains can enable greater flexibility in the management and utilization of network resources, such as Dynamic Network Slicing while at the same time avoiding or mitigating network resource conflicts. These interactions can enhance the monitoring and sharing of different network parameters such as bandwidth, latency, proximity, etc. These interactions can also permit an intelligent, pre-emptive reservation of network capacity, optionally constrained by location and time, to ensure that customer SLAs are met.

Figure 6:
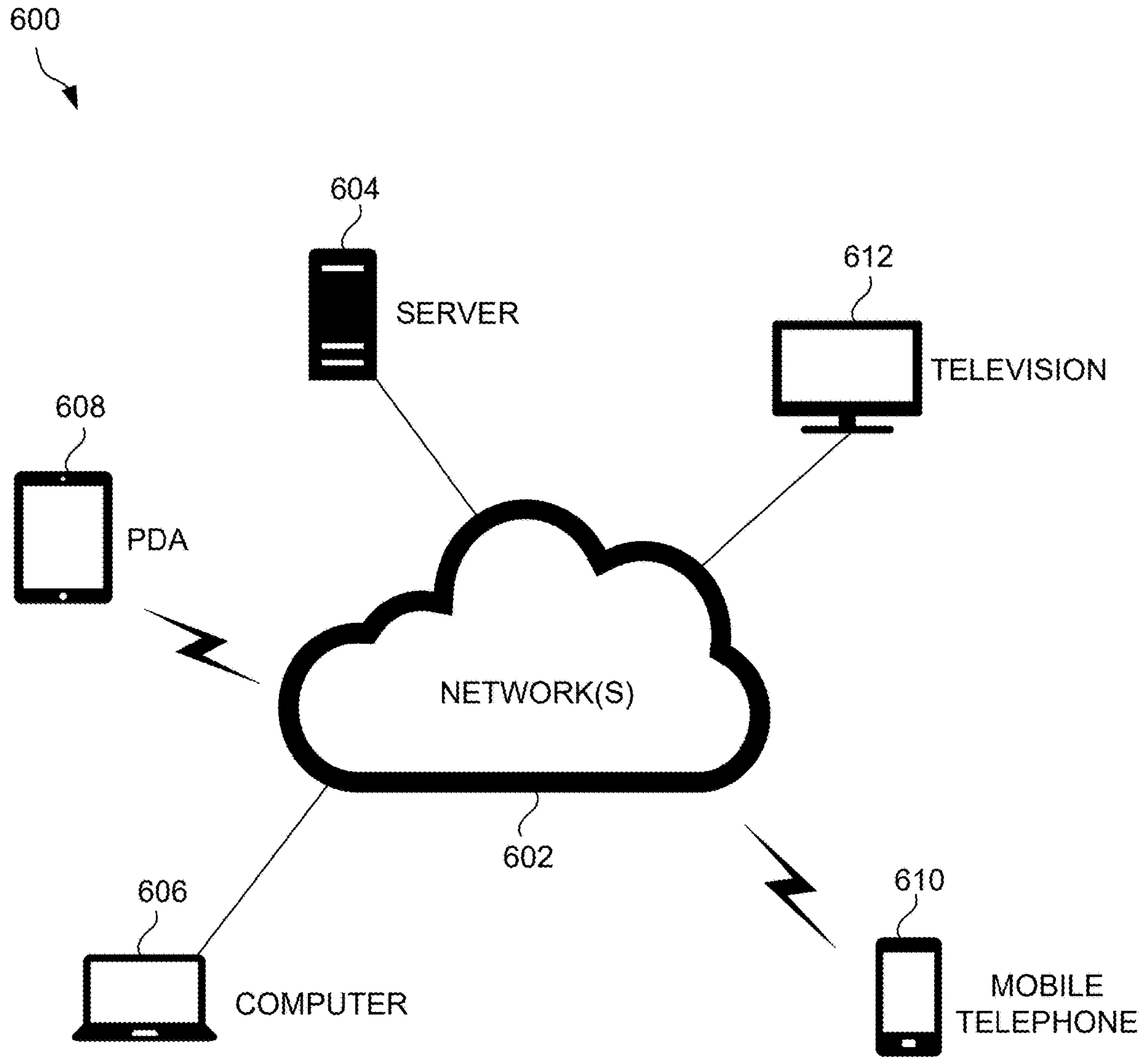
FIG. 6 illustrates a network architecture, in accordance with one possible embodiment.

FIG. 6 illustrates a network architecture 600, in accordance with one possible embodiment. As shown, at least one network 602 is provided. In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 604 and an end user computer 606 may be coupled to the network 602 for communication purposes. Such end user computer 606 may include a desktop computer, lap-top computer, and/or any other type of logic. Still yet, various other devices may be coupled to the network 602 including a personal digital assistant (PDA) device 608, a mobile phone device 610, a television 612, etc.

Figure 7:
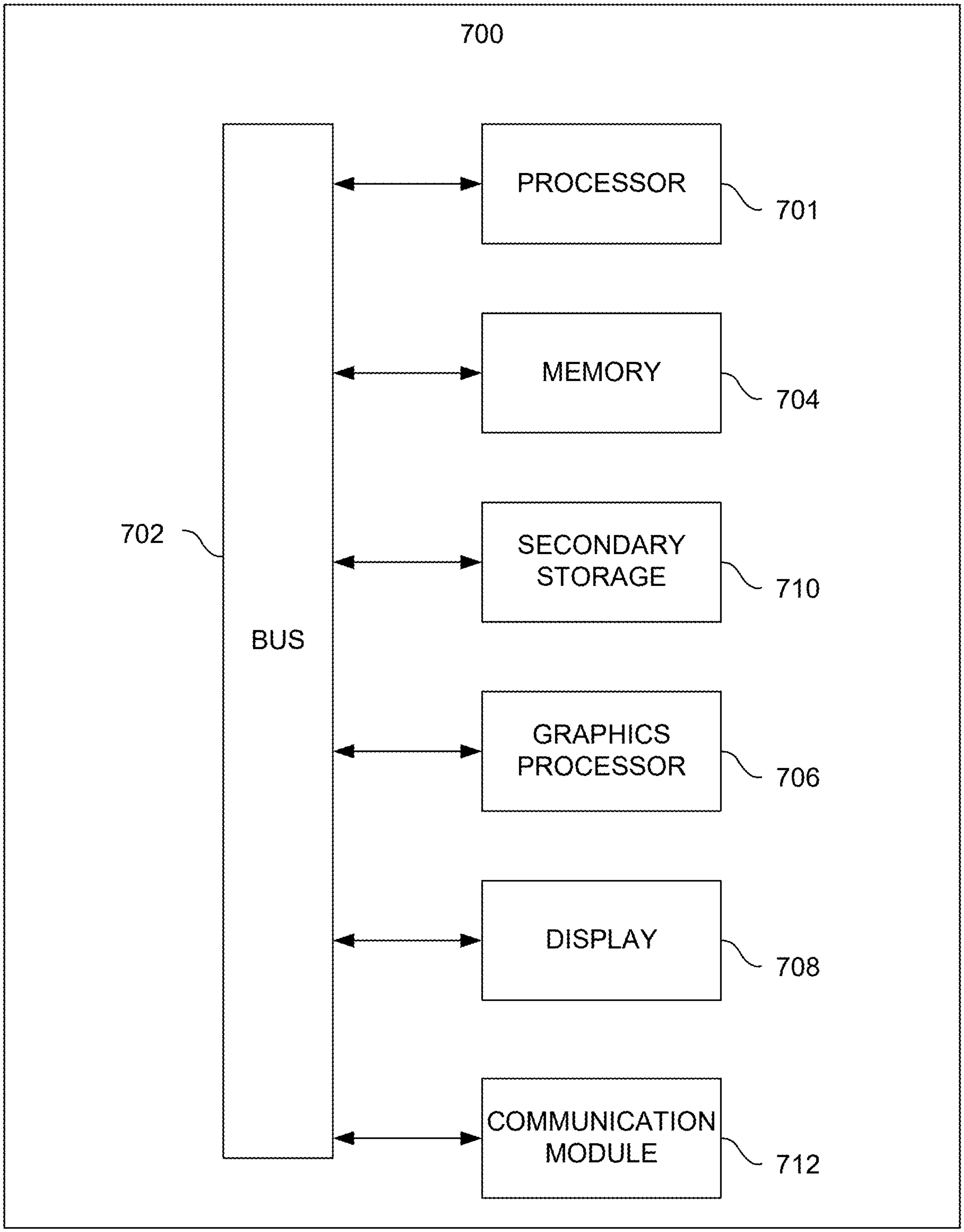
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. Of course, the system 700 may be implemented in any desired environment.

As shown, a system 700 is provided including at least one central processor 701 which is connected to a communication bus 702. The system 700 also includes main memory 704 [e.g. random access memory (RAM), etc.]. The system 700 also includes a graphics processor 706 and a display 708.

The system 700 may also include a secondary storage 710. The secondary storage 710 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 704, the secondary storage 710, and/or any other memory, for that matter. Such computer programs, when executed, enable the system 700 to perform various functions (as set forth above, for example). Memory 704, storage 710 and/or any other storage are possible examples of non-transitory computer-readable media.

The system 700 may also include one or more communication modules 712. The communication module 712 may be operable to facilitate communication between the system 700 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:

receive, from an application by a platform that interfaces a network, a request to reserve one or more capabilities of the network for use by the application at a future location defined in the request and at a future time defined in the request; and communicate, by the platform, with an active inventory of the network for handling the request, wherein the active inventory maintains a real-time or near-real time state of the capabilities of the network and enables pre-emptive reservations of network resources for future use, and wherein the platform communicating with the active inventory causes the active inventory to:

verify availability of network resources required for the request at the future location and the future time, and upon verifying that the network resources required for the request will be available at the future location and the future time, reserve the network resources for use by the application at the future location and the future time, wherein the reservation ensures that a service level agreement associated with the application will be met.

2. The non-transitory computer-readable media of claim 1, wherein the network is provided by a communication service provider and wherein the application is provided by an entity external to the communication service provider.

3. The non-transitory computer-readable media of claim 1, wherein the active network inventory is managed by an End-to-End Service Orchestrator.

4. The non-transitory computer-readable media of claim 1, wherein the capabilities of the network include network services, network functions, network resources, and a business support system (BSS).

5. The non-transitory computer-readable media of claim 1, wherein the request is associated with an order for a service in the network.

6. The non-transitory computer-readable media of claim 1, wherein the request includes at least one event notification that is of interest to the application.

7. The non-transitory computer-readable media of claim 1, wherein the request informs of at least one parameter to be provisioned.

8. The non-transitory computer-readable media of claim 7, wherein the at least one parameter includes bandwidth in the network.

9. The non-transitory computer-readable media of claim 1, wherein the request is for setup of an edge computing environment in the network.

10. The non-transitory computer-readable media of claim 1, wherein the request is for a background data transfer.

11. The non-transitory computer-readable media of claim 1, wherein the request informs of at least one provisioned traffic influence rule including for a planned setup of an edge in the network.

12. The non-transitory computer-readable media of claim 1, wherein the active inventory stores information associated with the request.

13. The non-transitory computer-readable media of claim 1, wherein the request is associated with a failed network resource allocation and includes to create additional resources in the network.

14. The non-transitory computer-readable media of claim 1, wherein the failed network resource allocation request relates to a failed background data transfer negotiation or a failed provisioning of a quality of service.

15. A method, comprising:

at a computer system:

receiving, from an application by a platform that interfaces a network, a request to reserve one or more capabilities of the network for use by the application at a future location defined in the request and at a future time defined in the request; and communicating, by the platform, with an active inventory of the network for handling the request, wherein the active inventory maintains a real-time or near-real time state of the capabilities of the network and enables pre-emptive reservations of network resources for future use, and wherein the platform communicating with the active inventory causes the active inventory to:

verify availability of network resources required for the request at the future location and the future time, and upon verifying that the network resources required for the request will be available at the future location and the future time, reserve the network resources for use by the application at the future location and the future time, wherein the reservation ensures that a service level agreement associated with the application will be met.

16. A system, comprising:

a non-transitory memory storing instructions; and one or more processors in communication with the non-transitory memory that execute the instructions to:

receive, from an application by a platform that interfaces a network, a request to reserve one or more capabilities of the network for use by the application at a future location defined in the request and at a future time defined in the request; and communicate, by the platform, with an active inventory of the network for handling the request, wherein the active inventory maintains a real-time or near-real time state of the capabilities of the network and enables pre-emptive reservations of network resources for future use, and wherein the platform communicating with the active inventory causes the active inventory to:

verify availability of network resources required for the request at the future location and the future time, and upon verifying that the network resources required for the request will be available at the future location and the future time, reserve the network resources for use by the application at the future location and the future time, wherein the reservation ensures that a service level agreement associated with the application will be met.

* * * * *